UNITED STATES PATENT OFFICE.

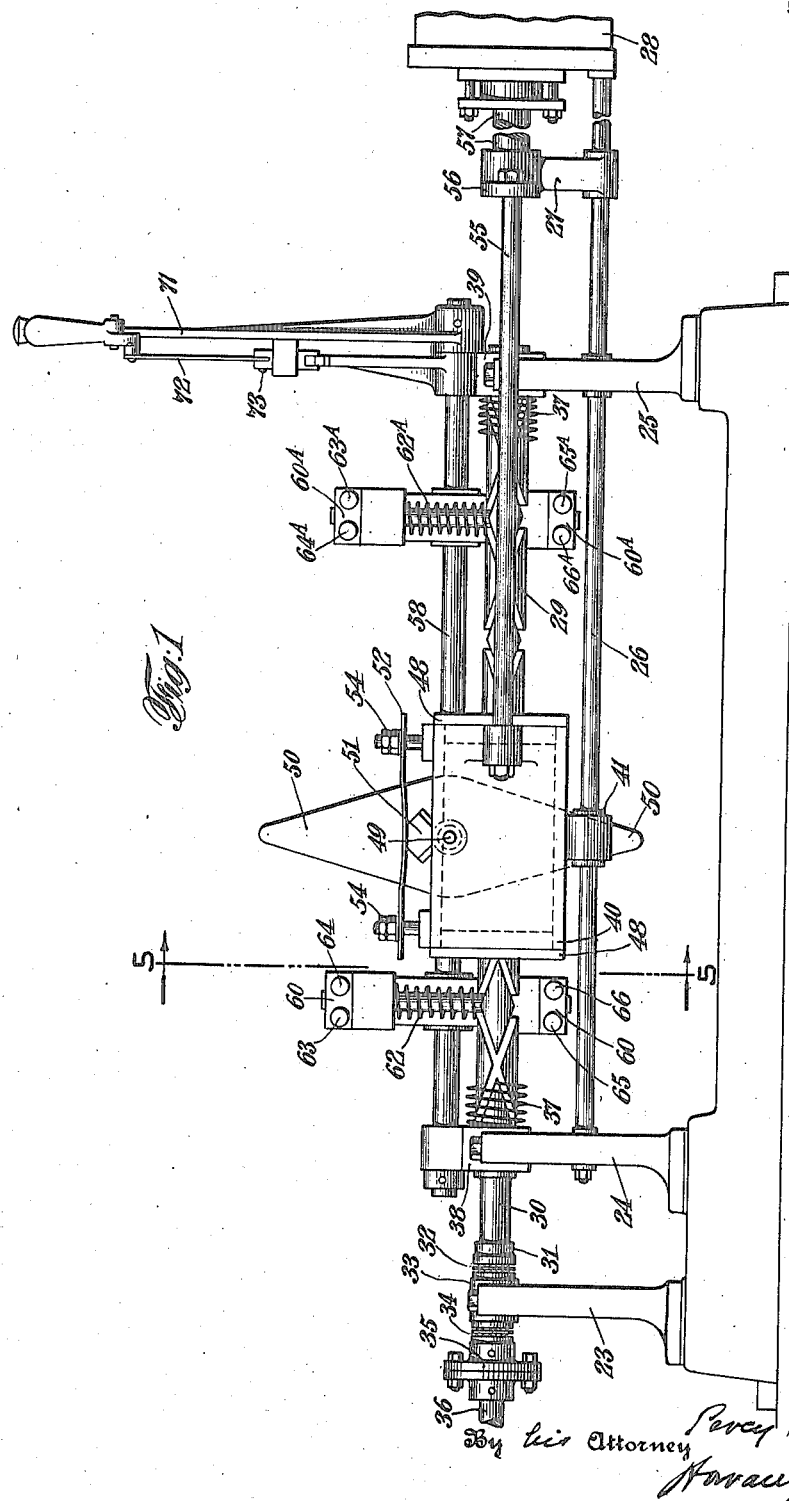

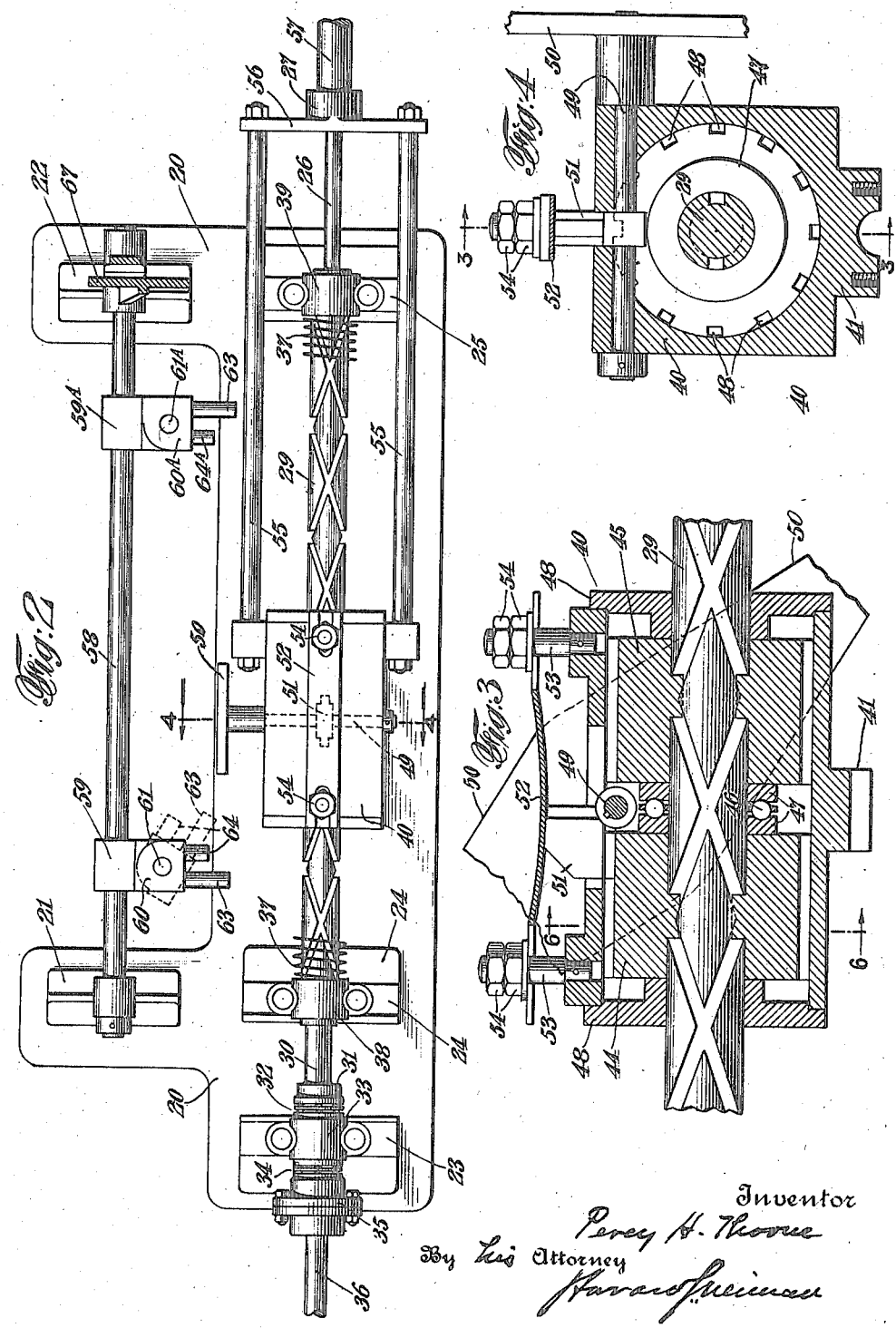

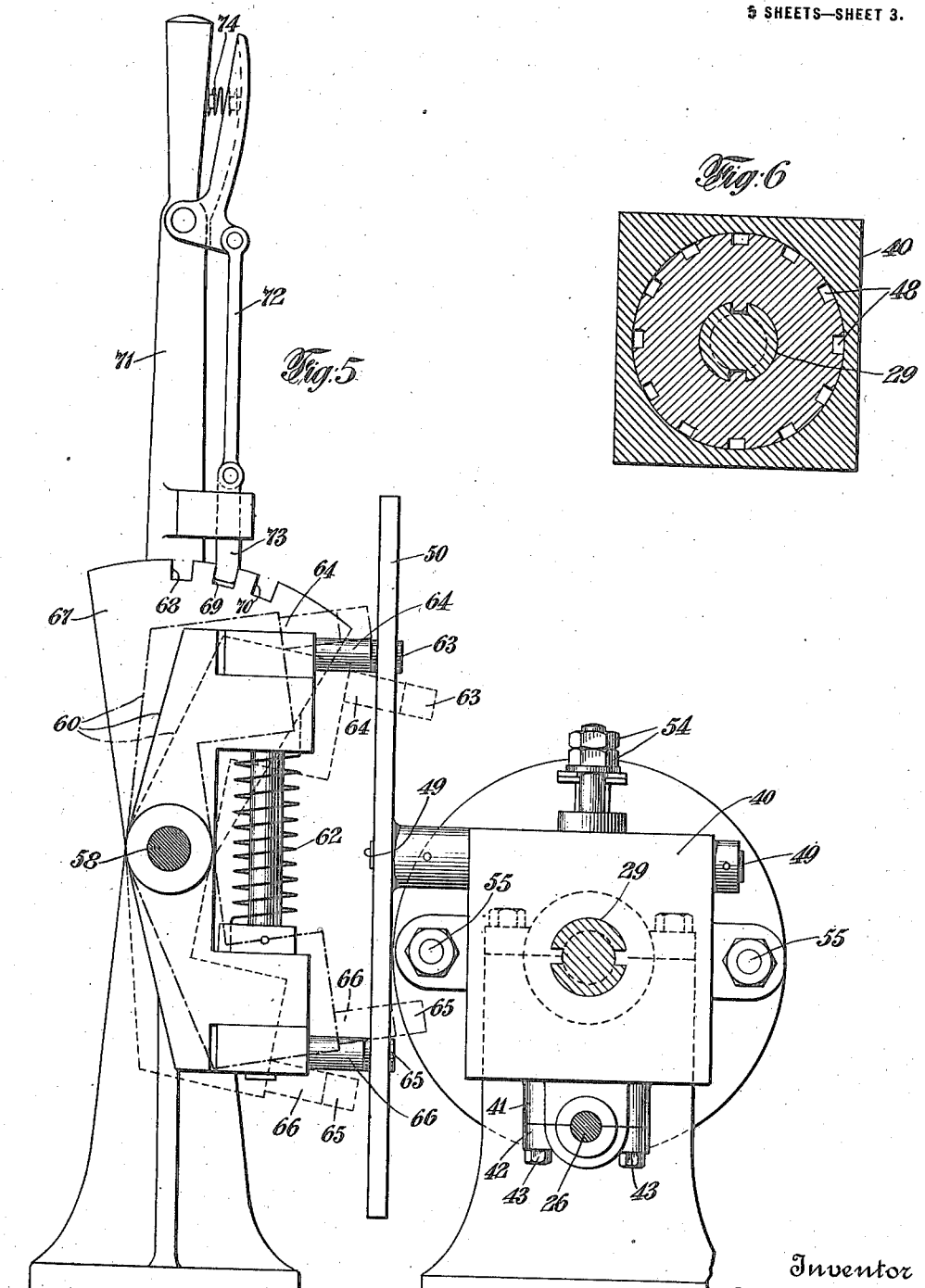

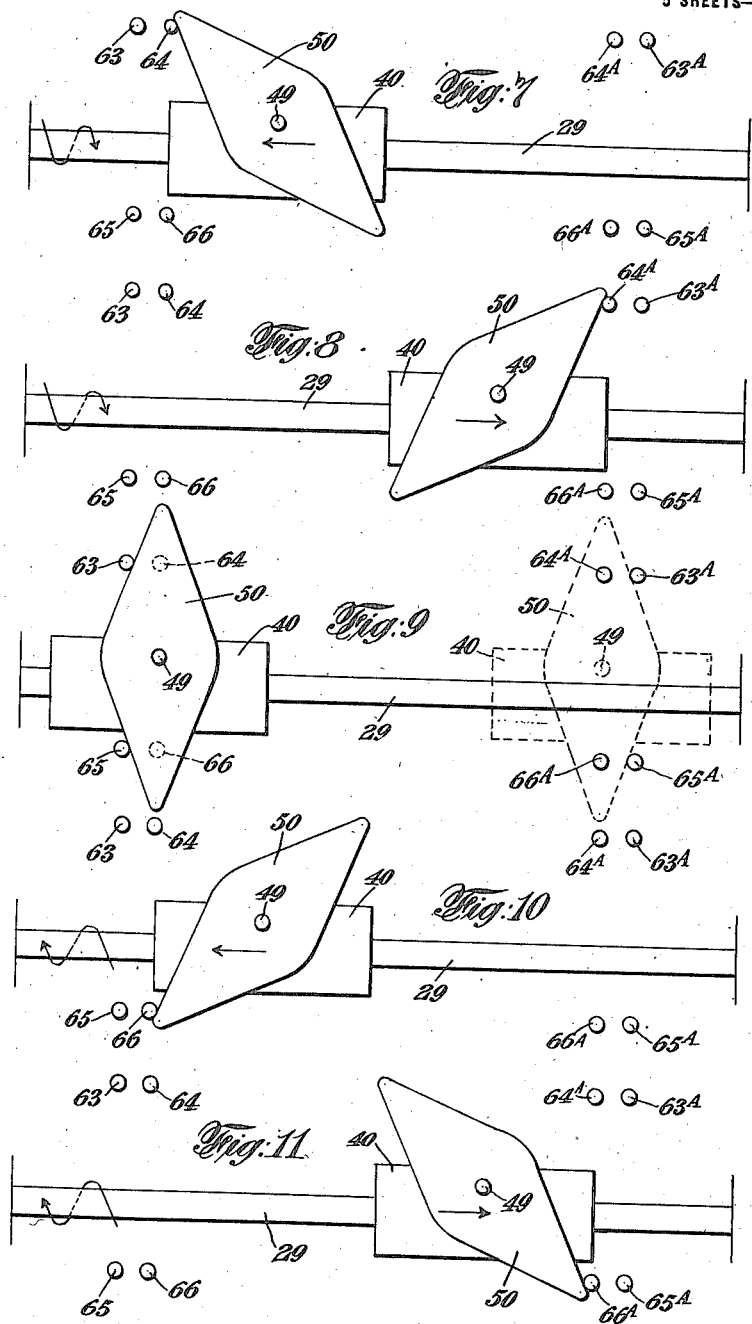

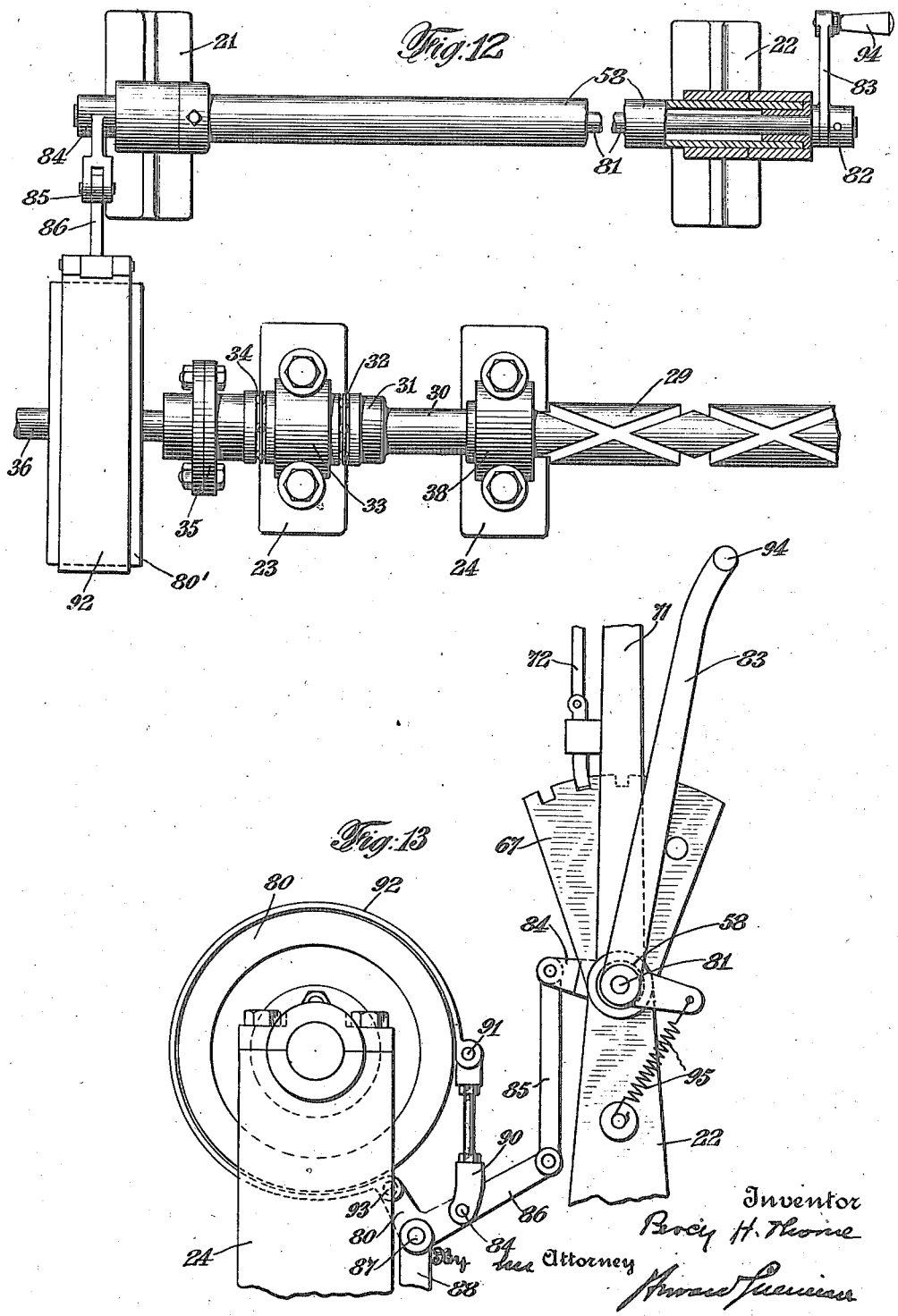

PERCY H. THORNE, OF PORTLAND, MAINE.

SHAFT-REVOLVING DEVICE.

1,263,487.   Specification of Letters Patent.   Patented Apr. 23, 1918.

Application filed November 12, 1917. Serial No. 201,418.

*To all whom it may concern:*

Be it known that I, PERCY H. THORNE, a citizen of the United States, residing in the city of Portland, county of Cumberland, and State of Maine, have invented certain new and useful Improvements in Shaft-Revolving Devices, of which the following is a full, clear, and exact specification.

My invention relates to a device for revolving shafts and refers particularly to a device suitable for revolving propeller shafts.

One object of my invention is a device whereby a shaft may be revolved with a minimum of friction and a maximum of effectiveness.

Another object of my invention is a device whereby a shaft may be revolved in either direction or maintained in a neutral position.

Another object of my invention is a device which may be connected directly to the piston rod of an engine to revolve a shaft.

Another object of my invention is a device whereby the rotation of a shaft may be easily and effectively reversed.

Another object of my invention is a device whereby the rotation of a shaft may be maintained in one direction during both movements of a piston rod of an engine.

Another object of my invention is a device whereby a shaft may be disengaged from the piston rod of an engine, so as to allow its non-movement during the movements of the piston rod.

Another object of my invention is a device whereby the power of an engine may be converted into the revolution of a shaft, economically, simply and effectively.

These and other objects of my invention will be evident upon a consideration of my specification, drawings and claims.

The effectiveness of a propeller shaft depends largely upon the speed of its revolution, the ability to place it in a neutral position, and the certainty of the reversal of its movement of revolution. In addition to these essential features, the power transmission mechanism must be such as to allow the use of vertical and horizontal engines of single and compound types, the maximum of power must be transmitted to the shaft, the device must be strong and durable to prevent unnecessary disorders, and the reversing mechanism must be simple and quick in operation and effective in performance. The device of my invention accomplishes all of these results and presents new and novel features of mechanical construction.

My invention comprises in a broad way the revolution of a shaft having right and left threads by means of a reciprocating motion in a plane parallel with the axis of the shaft, with automatic tripping means whereby the direction of rotation of the shaft will be continuous irrespective of the motion of the reciprocating member, and means whereby the rotation of the shaft may be readily reversed.

While the drawings show the reciprocating member connected with a horizontal engine, it is evident that it may be readily applied to vertical engines, by transmitting the vertical movement of the piston rods to the reciprocal motion by any well known or suitable means.

In the accompanying drawings, illustrating one form of my device, similar parts are designated by similar numerals.

Figure 1 is an elevation of one form of my device.

Fig. 2 is a top plan view partly in cross-section for clearness of description.

Fig. 3 is a cross-section through the line 3—3 of Fig. 4.

Fig. 4 is an enlarged cross-section through the line 4—4 of Fig. 2.

Fig. 5 is a cross-section through the line 5—5 of Fig. 1, showing the tripping members in various positions in broken and dotted lines.

Fig. 6 is a cross-section through the line 6—6 of Fig. 3.

Figs. 7 and 8 show the trip and tripping members at the two end positions of the forward revolution of the shaft.

Fig. 9 shows the trip and tripping members at the two end positions when the shaft is free to revolve.

Figs. 10 and 11 show the trip and tripping members at the two end positions of the backward revolution of the shaft.

Fig. 12 is a top plan view, partly in cross-section of a braking means for the shaft.

Fig. 13 is an end view of Fig. 12 in the direction of the arrow 13.

The frame plate 20 is supported by the supports 21, 22, 23, 24 and 25. The supports 24 and 25 carry the fixed bar 26 extending through the yoke 27 and being fixedly attached to the head of the piston chamber 28. Revolubly carried by the supports 24 and 25 is the right and left threaded shaft 29, extended into the portion 30 carrying the integral collar 31. Ball bearings 32 are situated between the collar 31 and the thrust bearing 33 and similar bearings 34 between the thrust bearing 33 and the coupling 35, the shaft 29 being extended into the shaft portion 36 which carries a propeller, not shown. Coiled springs 37, 37 surround the shaft 29 and abut upon bearings 38 and 39 carried by the supports 24 and 25. Slidably movable over the shaft 29 is the carriage 40, the lower portion of which is extended downwardly and composed of the two members 41 and 42, (Fig. 5) bolted together by the screw bolts 43, 43, and carrying an annular opening encompassing the bar 26 which is slidable thereover.

Revolubly carried by the carriage 40 are two annular members 44, the interior of which has two right handed threads capable of enmeshment with the threads of the shaft 29 and 45, the interior of which has two left handed threads capable of enmeshment with the threads of the shaft 29. Situated between the members 44 and 45 is a thrust bearing formed by the ball bearings 46 and the annular retaining members 47, 47. The exterior peripheries of the two annular members 44 and 45 carry a series of longitudinal recesses 48, 48. The revoluble shaft 49 carries a diamond shaped trip 50 and a locking member 51, the latter being capable of insertion within the recesses 48, 48 of the members 44 and 45. A curved flat spring 52, has its two ends cut out in order to allow the insertion therein of the screw bolts 53, 53, the spring being slidable over the bolts and being held in abutment against the locking member 51 by the nuts 54, 54. As the locking member 51 has three sides capable of abutment against the spring 52, the latter will operate to hold the former in anyone of these positions against accidental movement. Two guide bars 55, 55 are fixedly attached to opposite sides of the carriage 40 and are fixedly attached to the yoke 27 by means of the connecting arm 56, the yoke 27 being capable of a slidable movement over the bar 26. The yoke 27 is attached to the piston rod 57 of the piston chamber 28.

Rotatably carried by the supports 21 and 22 is the rock-shaft 58 carrying the fixedly attached brackets 59, 59A. These brackets carry the rotatable members 60, 60A, pivotally attached to the brackets 59, 59A and 61, 61A. The members 60, 60A are pivotally movable inwardly only, as shown by the dotted lines of Fig. 2, but are returned to their normal position by means of the torsion springs 62, 62A, and are prevented from outward pivotal movement for reasons explained later. The member 60 carries the trip pins 63, 64 upon its upper arm and the trip pins 65, 66 upon its lower arm, the pins 63 and 65 being longer than the pins 64 and 66. The member 60A carries trip pins 63A, 64A, 65A and 66A corresponding to the trip pins of the member 60. Fixedly attached to the frame 20 is the broken circular segment 67 having the three notches 68, 69 and 70. Fixedly attached to the rockshaft 58 is arm 71, to which is pivotally attached the arm 72, the lower extremity of which 73 is capable of being introduced with the notches 68, 69 and 70. The spring 74 tends to keep the extremity 73 in engagement with the notches.

The operation of the device is as follows:—

In order to place the mechanism in neutral position, so that the movement of the carriage will not rotate the shaft 29, the lever 71 is rotated so that the member 73 is in engagement with notch 69 of the segment 67 as shown in Fig. 1 and in full lines in Fig. 5. As the carriage moves backward and forward, the trip 50 will pass the trip pins 64, 66, 64A and 66A and abut upon the trip pins 63, 65, 63A, 65A, thus maintaining the trip 50 in a vertical position, as shown in Fig. 9. When the trip 50 is in this vertical position, the locking member 51 will be in the position shown in Fig. 1 and will not be inserted in the recesses of either of the members 44 and 45 which are therefore free to revolve, the motion of the carriage therefore not revolving the shaft 29.

If it is desired to give the shaft 29 a motion which will give the vessel carrying it a forward motion, the lever 71 is moved until the member 73 is in engagement with the notch 70 of the segment 67, the member 60 then being in the position shown in dotted lines of Fig. 5. This movement will revolve the rock shaft 58 until the trip pins 64 and 64A are in the path of the trip 50. As the carriage passes in the line of the arrow of Fig. 7, the pin 64 will abut upon the trip 50, the former movement of the carriage revolving the trip 50 into the position shown in Fig. 8, and as the carriage moves in the direction of the arrow of Fig. 8, the pin 64A will revolve the trip 50 back into its position in Fig. 7 The position of 50, as shown in Fig. 7, revolves the locking member 51 into a locking condition with the member 44 locking the member with the right handed thread of the shaft 29, thus revolving the shaft 29 in the direction of the arrow. As the trip 50 is reversed by the pin 64, the locking member 51 is revolved from engagement with the member 44 and is engaged with the member 45 locking that member with the left handed thread of the shaft 29, thus continuing the rotation of the shaft 29 in the same direction during the motion of the carriage as shown by the arrow of Fig. 8.

If it is desirous of giving the shaft 29 a continuous reverse movement, the lever 71 is moved until the member 73 engages the notch 68 of the segment 67, the member 60 then being in the position shown in broken lines in Fig. 5. The trip 50 will then be operated upon by the pins 66 and 66^A, as shown in Figs 10 and 11.

It is thus seen that the direction of the rotation of the shaft 29 is governed by the position of the arm 71, and that the continuation of the revolution of the shaft in one direction is controlled by the abutment of the several tripping pins upon the trip 50, causing its revolution and consequent alternate engagement and disengagement of the members 44 and 45 with the right and left handed threads of the shaft 29.

The reason for the rotary movement of the members 60 and 60^A with their pins 63, 64, 63^A, 64^A is as follows:—

When the carriage 40 has gone as far as possible to the left (Fig. 7), the trip 50 will be at the inclination, shown in Fig. 8, the pine 64 abutting upon the upper left side of the trip 50. If now, at this instant, the bar 71 should be moved to accomplish the neutral position of the shaft 29, the pins 65 and 66 will be moved toward the trip 50 and the pin 65 will extend over the lower right hand side of the trip 50, the trip 50 being thus held between the pins 64 and 65. If both of these pins 64 and 65 were held in right engagement, the carriage 40 could not be moved. By having the pin 64 revoluble however, the movement of the carriage 40 revolves the pin and allows the carriage to move, the pin 64 however being returned to its original position by the action of the spring 62 and prevented from revolution in the opposite direction.

Figs. 12 and 13 show a convenient method of braking the revolution of the shaft 29 when passing from forward to backward revolution or vice versa. It may be advisable at times, when a sudden reversal of the rotation is desired, to have a means whereby the one motion may be stopped or slowed before starting the reverse revolution. I accomplish this by fixedly attaching a fly wheel 80 to the extension 36 of the shaft 29. In this case the rock shaft 58 is hollow, revolubly carried within the interior thereof being the shaft 81, to one end of which is fixedly attached the collar 82, carrying the arm 83. Fixedly attached to the other end of the shaft 81 is the collar 65 and arm 84. Pivotally attached to the arm 84 is the link 85, to which is pivotally attached the angle arm 86, the latter being pivoted at 87 to the member 88 fixedly attached to a convenient portion of the supporting frame. Pivotally attached at 89 to the member 86, is the member 90, slightly bent at the lower end as illustrated, the upper portion of the member 90 being pivotally attached at 91 to the brake band 92, the other end of which is pivotally attached at 93 to the link 86. A spring 95 tends to maintain the arm 83 in the position shown in Fig. 13.

In order that there may be no confusion between the arms 83 and 71, the former carries a handle 94 at right angles. It is evident that as the handle 83 is pulled toward the left in Fig. 13, the links 85 and 86 will be moved downwardly, the downward movement of the link 86 carrying with it the link 90 and drawing the brake band 92 tightly around the fly wheel 80, while at the same time the movement of the arm of the link 86 to which the brake band 92 is pivoted at 93 will draw the brake band 92 tightly around the fly-wheel 80, these two movements causing the brake band 92 to abut tightly around the fly-wheel 80, thus acting as a brake for the latter stopping the revolution of the shaft 29.

While I have shown my invention applied to a propeller shaft, it is not limited to that application, but may be employed to revolve shafts for any desired purpose.

I do not limit myself to the size, number, shape or arrangement of parts as described and shown, all of which may be varied without going beyond the scope of my invention as described and claimed.

What I claim is:—

1. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, each annular member having indents in the outer periphery thereof, locking means carried by the carriage capable of insertion in the indents of the annular members to lock them from revolution, means synchronized with the movement of the carriage for locking and unlocking the annular members from revolution, means for imparting a reciprocating movement to the carriage causing the shaft to revolve continuously in one direction.

2. In a shaft revolving device, in combination, a revoluble shaft having right and left threads thereon, a non-revoluble carriage slidable longitudinally over said shaft.

two revoluble annular members carried by the carriage having respectively right and left threads engaging the threads of the shaft, locking means upon the carriage capable of alternately locking and unlocking the annular members from revolution, means for imparting a reciprocating motion to the carriage and means exterior of the carriage for automatically locking one annular member and unlocking the other annular member from revolution at each end of the reciprocal motion of the carriage, causing the shaft to revolve continuously in one direction.

3. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, locking means upon the carriage capable of alternately locking and unlocking the annular members from revolution, means for imparting a reciprocating motion to the carriage and means exterior of the carriage for automatically locking or unlocking the annular members from revolution causing the shaft to revolve continually in either direction or remain from revolution.

4. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, means for imparting a reciprocating motion to the carriage, a trip carried by the carriage, means abuttable upon the trip whereby the position of the trip will lock and unlock each of the annular members from revolution causing the shaft to revolve continuously in one direction, means whereby the position of the trip will unlock both of the annular members from revolution allowing the shaft to remain at rest and means for varying the position of the trip.

5. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, each annular member having indents in the outer periphery thereof, means for imparting a reciprocating motion to the carriage, a revoluble shaft carried by the carriage, a locking member fixedly attached to the revoluble shaft carried by the carriage, means whereby the locking member may be inserted into and removed from the indents of the annular members and means for automatically operating the locking member causing the shaft to revolve continuously in either direction or remain at rest during the movement of the carriage.

6. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, each annular member having indents in the outer periphery thereof, means for imparting a reciprocating motion to the carriage, a revoluble shaft carried by the carriage, a locking member fixedly attached to the revoluble shaft carried by the carriage, means exterior of the carriage whereby the locking members will be alternately inserted into and removed from the indents of the annular members at the end of each reciprocating movement of the carriage causing the shaft to revolve continuously in one direction.

7. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, means for imparting a reciprocating motion to the carriage, a trip carried by the carriage, and tripping means exterior of the carriage and capable of introduction into the path of the trip whereby the trip will be moved to consecutively lock and unlock the annular members from revolution, causing the shaft to revolve continuously in either direction.

8. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, means for imparting a reciprocating motion to the carriage, a trip carried by the carriage, and tripping means exterior of the carriage and capable of introduction into the path of the trip whereby the trip will be moved to consecutively lock and unlock the annular members from revolution, causing the shaft to revolve continuously in either direction, or to remain at rest.

9. In a shaft revolving device, in combination, a revoluble shaft having right and left threads thereon, a non-revoluble carriage slidable longitudinally over said shaft, two revoluble annular members carried by the carriage having respectively right and left threads engaging the threads of the shaft, means for imparting a reciprocating motion to the carriage, a trip carried by the carriage, tripping means exterior of the carriage and capable of introduction into the path of the trip whereby the trip will be moved to consecutively lock and unlock the annular members from revolution, causing the shaft to revolve continuously in either direction, means whereby the tripping means may be introduced into or removed from the path of the trip and means for stopping the revolution of the shaft.

Signed at New York city, in the county of New York and State of New York this 8th day of November, 1917.

PERCY H. THORNE.